(12) United States Patent
Sherriff

(10) Patent No.: US 8,474,110 B1
(45) Date of Patent: Jul. 2, 2013

(54) CLIP APPARATUS

(76) Inventor: Anthony M. Sherriff, Spring Lake, MI (US)

( * ) Notice: Subject to any disclaimer, the term of this patent is extended or adjusted under 35 U.S.C. 154(b) by 189 days.

(21) Appl. No.: 13/072,482

(22) Filed: Mar. 25, 2011

Related U.S. Application Data

(60) Provisional application No. 61/340,959, filed on Mar. 25, 2010.

(51) Int. Cl.
*B60N 3/00* (2006.01)
*B60R 13/02* (2006.01)

(52) U.S. Cl.
USPC .................................. 24/458; 24/297; 296/214

(58) Field of Classification Search
USPC  24/297, 458, 292, 291, 289, 581.11; 296/214
See application file for complete search history.

(56) References Cited

U.S. PATENT DOCUMENTS 6,594,870 B1 * 7/2003 Lambrecht et al. ............ 24/297
7,152,281 B2 * 12/2006 Scroggie ........................ 24/297

* cited by examiner

*Primary Examiner* — Robert J Sandy
*Assistant Examiner* — Abigail E Morrell
(74) *Attorney, Agent, or Firm* — The Watson I.P. Group, PLC; Jovan N. Jovanovic; Vladao M. Vasiljevic

(57) ABSTRACT

A clip apparatus including a housing with a base and a frame. A first retention arm and a second retention arm are rotatably coupled to the base and include a pivoting leg and a retention leg. Upon insertion of the frame into an opening of an outside surface, the opening directs the pivoting leg to rotate the respective retention arm, which, in turn, directs the retention legs into a position wherein the outside surface is sandwiched between the respective retention legs of the retention arms and an inner surface of the base.

20 Claims, 11 Drawing Sheets

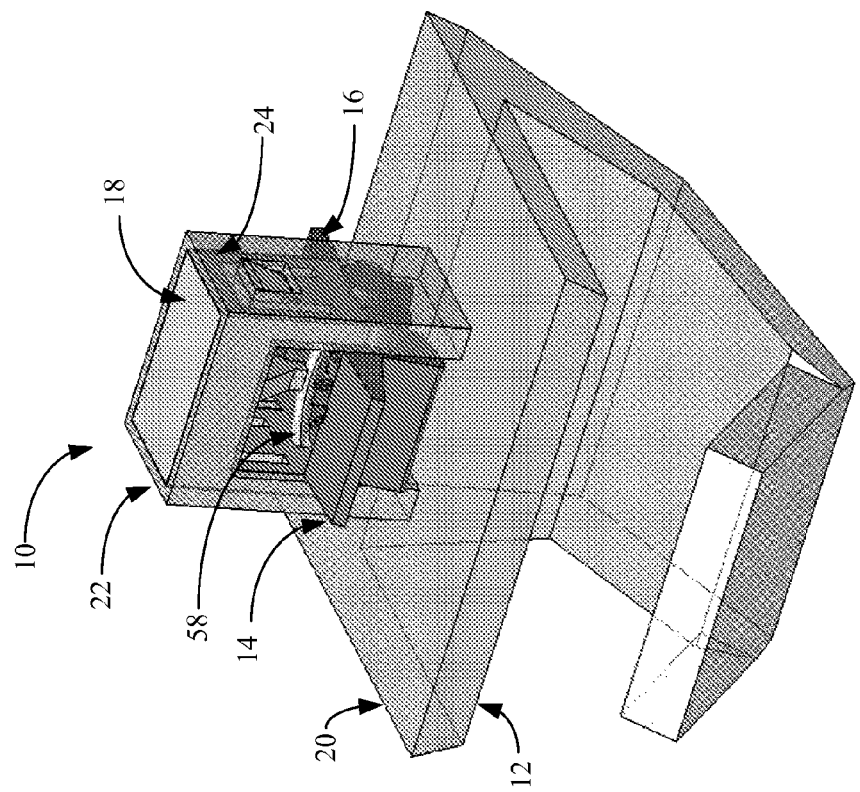
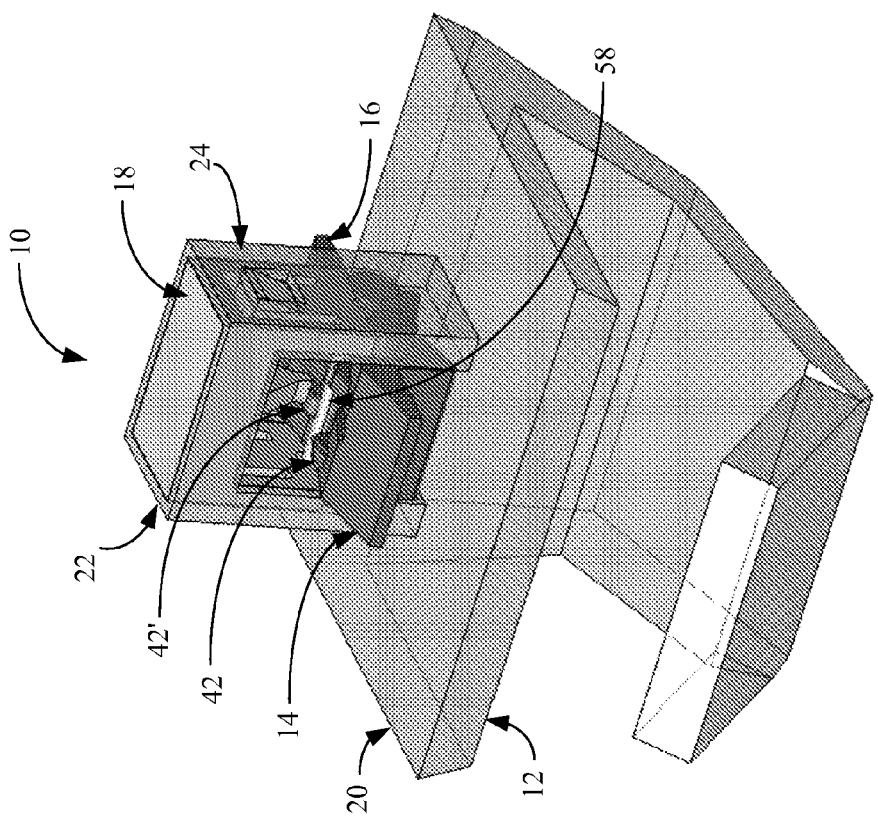
Figure 7b
Figure 7a

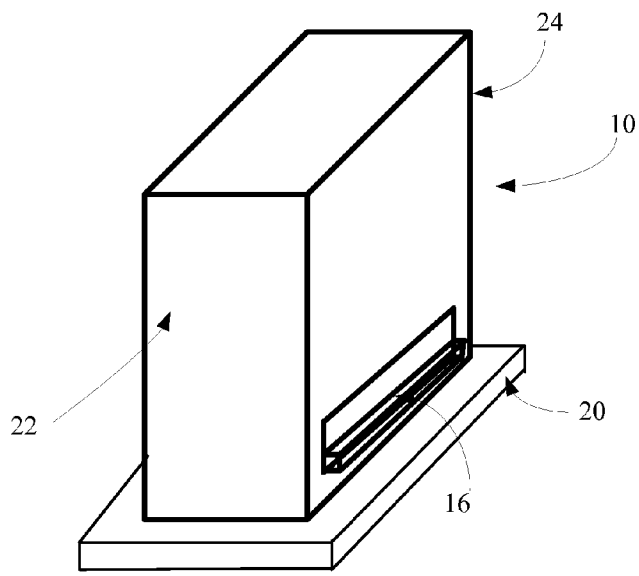
Figure 15
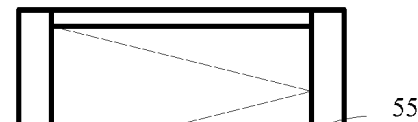
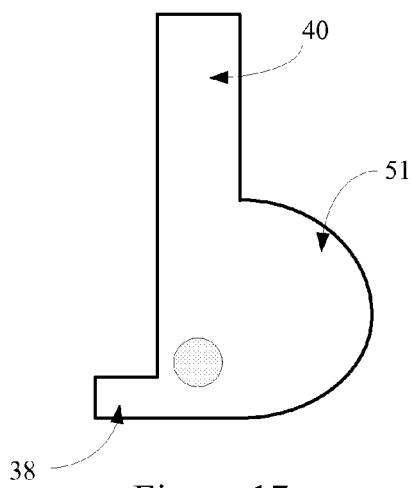
Figure 17
Figure 16

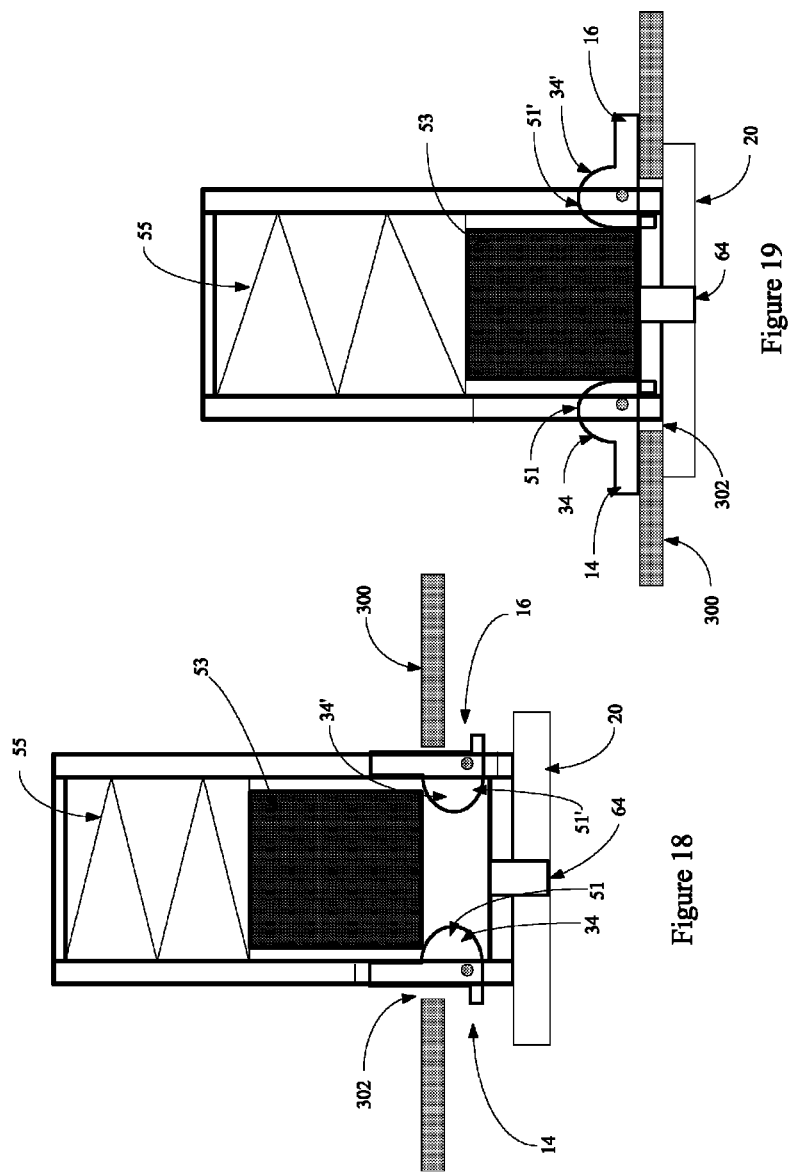

CLIP APPARATUS

CROSS-REFERENCE TO RELATED APPLICATION

This application claims priority from U.S. Prov. Pat. App. Ser. No. 61/340,959 filed Mar. 25, 2010, entitled "Clip Apparatus," the entire specification of which is hereby incorporated by reference in its entirety.

BACKGROUND OF THE DISCLOSURE

1. Field of the Disclosure

The disclosure relates in general to a retaining system or assembly, and more particularly, to a clip apparatus configured to retain objects. Among other uses, and while not being limited thereto, the clip apparatus of the present disclosure is well suited for the attachment of various structures in an automotive application, such as automobile headliners and accessories thereto.

2. Background Art

The use of attachment clips, especially in the automotive field comprise a spring steel pre-form which is manufactured in a progressive stamping die. The clip is attached by sheet metal screws to various automotive components and subsequently items are clipped thereto.

There have been some drawbacks to such a configuration. Specifically, the foregoing clips are often misaligned or have variations due to variations on the body. Thus, the coupling, or clipping, of structures to the prior art clips often requires excessive force. In certain assembly procedures, operators use mallets, hammers, weighted gloves or other means by which to impact additional force. Such excessive force can damage the clip structure.

The damage to the clip often degrades the retention abilities of the clip. Further, the clip portion often includes a plurality of clip legs, which can be damaged by the excessive force. Problematically, the clips have features and structures which form both the insertion and retention features. Such dual purpose components have deficiencies, as ultimately properties directed to insertion require compromises with respect to retention design and vice versa. Still further, the overall installation cost is rather expensive and requires a number of different components.

SUMMARY OF THE DISCLOSURE

The disclosure is directed to a clip apparatus. The clip apparatus comprises a housing, a first retention arm, a second retention arm, and an arm locking assembly. The housing includes a base having an inner surface and a frame extending away from the inner surface. The frame defines a central cavity with a first and a second opposing passage.

The first retention arm includes a body with a pivoting leg extending radially outward from the body and a retention leg extending radially outward from the body. The two legs are radially spaced apart from each other. The body is rotatably coupled to the frame so as to rotate about a first axis of rotation. In a retracted orientation, at least a portion of the pivoting leg extends outside of the cavity through the first opposing passage and, through rotation, is positionable in a deployed orientation wherein the retention leg extends outside the cavity through the first opposing passage so as to be spaced apart from the base. It is then in a position to sandwich an outside surface therebetween;

The second retention arm includes a body with a pivoting leg extending radially outward from the body and a retention leg extending radially outward from the body. The two legs are radially spaced apart from each other. The body is rotatably coupled to the frame to rotate about a second axis of rotation spaced apart from the first axis of rotation. At least a portion of the pivoting leg extends outside of the cavity through the second opposing passage and through rotation is positionable in a deployed orientation wherein the retention leg extends outside of the cavity through the second opposing passage so as to be spaced apart from the base. It is then in a position to sandwich an outside surface therebetween.

The arm locking assembly is structurally configured to retain the first and second retention arms in the deployed orientation.

In a preferred embodiment, the frame further comprises a first side wall, and a second side wall. These walls together define the opposing side passages and the cavity.

In one such preferred embodiment, the frame further comprises a first upper cross brace and a second upper cross brace spaced apart from one another and positioned from an opposing edge of the first side wall to an opposing edge of the second side wall. The upper cross braces are spaced apart from the base.

In one such embodiment, the first upper cross brace, the second upper cross brace, the base and the opposing edges of the first side wall and the second side wall together define the opposing side passages.

In another such embodiment, the cavity is defined between the first and the second side wall and the first and the second upper cross brace.

In another embodiment, wherein an upper opening is defined by the first and the second side wall and the first and the second upper cross brace at an upper end thereof.

In yet another preferred embodiment, the clip further includes a first set of opposing cradles and a second set of opposing cradles positioned on the opposing side walls of the housing. The cradles couple to opposing respective ends of the first and the second retention arms to define each axis of rotation thereof.

In one such preferred embodiment, the first retention arm and the second retention arm each comprise an opposing pair of pivots positioned on a first end and a second end of the respective elongated body. These pivots are placed into and cooperate with the opposing sets of cradles.

In a preferred embodiment, each pivoting leg is positioned within the central cavity in the deployed orientation.

In another preferred embodiment, the arm locking assembly comprises a releasable locking assembly. As such, once in the deployed orientation, the locking assembly can be overcome so as to facilitate redirection of the retention arms toward a retracted orientation.

Preferably, in certain embodiments, the arm locking assembly further comprises a biasing member and at least one interfacing rib. The biasing member has a first end and a second end coupled to the frame. The biasing member extends between the first and second retention arms. The at least one interfacing rib is positioned along each elongated body of the first and the second retention arms. Upon rotation of the retention arms into a deployed orientation the interfacing ribs interface with the biasing member to releasably maintain the retention arms in the deployed orientation.

In another preferred embodiment, the housing further includes an access hole which provides access through the base to the biasing member.

In a preferred embodiment, the arm locking assembly further includes a locking cap having a top wall with a first end and a second end. A first leg depends from the first end of the top wall. A second leg depends from the second end of the top wall. Each one of the legs having a proximal end and a distal end and a groove positioned on the distal end to engage the biasing member upon insertion of the locking cap into the cavity.

In another embodiment, the apparatus further includes means for coupling the locking cap to the housing. The means comprises one of a slot and a tab associated to one of the first side wall and the second side wall and the other of a slot and a tab associated with the first leg and the second leg. Upon insertion of the locking cap into the frame each slot is directed to interface each of the tabs to couple the locking cap to the housing.

In another embodiment, the arm locking assembly comprises a pair of opposing biasing legs which are positioned on the frame. Each biasing leg is positioned proximate the biasing member and movable to accept the biasing member. Upon positioning of the biasing member into the desired orientation, the opposing biasing legs return to a configuration to retain the biasing member in the desired orientation.

In one such embodiment, the opposing biasing legs further retain the first and second retention arms in the desired orientation.

In another such embodiment, the first retention arm and the second retention arm each include an extended hump region which is obstructive within the cavity when the first retention arm and the second retention arm are in an orientation other than the deployed orientation. In such an embodiment, the arm locking assembly further comprises a locking block that is configured to pass beyond the extended hump regions once the first and second retention arms are in a deployed orientation so as to be positioned between the first retention arm and the second retention arm within the cavity. A block biasing member is also provided which is configured to direct the block toward the base, to, in turn, maintain the locking block between the first retention arm and the second retention arm.

In a preferred embodiment, the base further includes an access opening that provides access to the cavity, to, in turn, facilitate the pushing of the locking block against the biasing member. This, in turn, facilitates the positioning of the first retention arm and the second retention arm in an orientation other than the deployed orientation.

In another aspect, the disclosure is directed to a method of articulating the clip apparatus which includes the steps of: providing an outside surface with an opening sized to allow the frame to pass therethrough; directing the frame through the opening; directing the first and second retention arms into a perimeter of the opening so as to interact with the same, whereupon such interaction rotates the first and second retention arms from a retracted orientation to a deployed orientation; and locking the first and second retention arms in the deployed orientation, to, in turn, capture the outside surface between the respective retention arms and the base, in a sandwiched configuration.

BRIEF DESCRIPTION OF THE DRAWINGS

The disclosure will now be described with reference to the drawings wherein:

FIG. 7a of the drawings is a perspective view of an embodiment of the clip apparatus of the present disclosure, showing, in particular, the apparatus having the first and second retention arms in a deployed orientation;

FIG. 7b of the drawings is a perspective view of an embodiment of the clip apparatus of the present disclosure, showing, in particular, the apparatus having the first and second retention arms in a deployed orientation, but with the biasing member being pushed so as to facilitate the return of the first and second retention arms toward the retracted orientation;

FIG. 15 of the drawings is a perspective view of a third embodiment of the present disclosure;

FIG. 16 of the drawings is a cross-sectional view of a third embodiment of the present disclosure, showing, in particular, the locking block and the block biasing member;

FIG. 17 of the drawings is a side elevational view of a first retention arm of the third embodiment of the clip apparatus of the present disclosure;

FIG. 18 of the drawings is a cross-sectional view of a third embodiment of the present disclosure, showing, in particular, the locking block and the block biasing member positioned when the retention arms are in the retracted orientation and the clip apparatus is being directed into the opening of an outside surface; and FIG. 19 of the drawing is a cross-sectional view of a third embodiment of the present disclosure, showing, in particular, the locking block and the block biasing member positioned when the retention arms are in the deployed orientation after the clip apparatus has been directed through the opening of the outside surface and the retention arms in cooperation with the base have sandwiched the outside surface therebetween.

DETAILED DESCRIPTION OF THE DISCLOSURE

Figure 1:
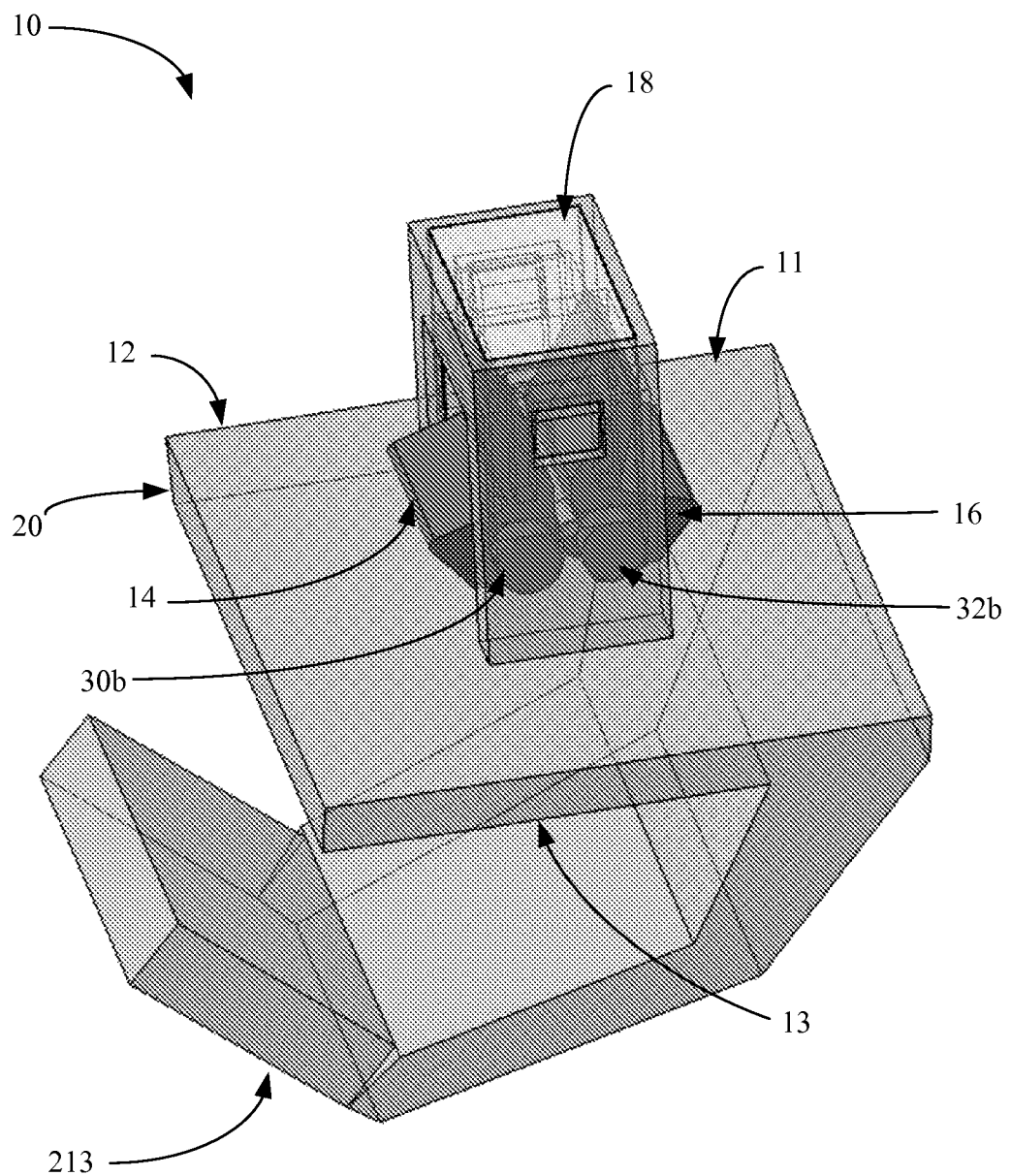
FIG. 1 of the drawings is a perspective view of an embodiment of the clip apparatus of the present disclosure, showing, in particular, the retention arms in a retracted orientation and a coat hook integrally formed with the base of the housing.
Figure 2:
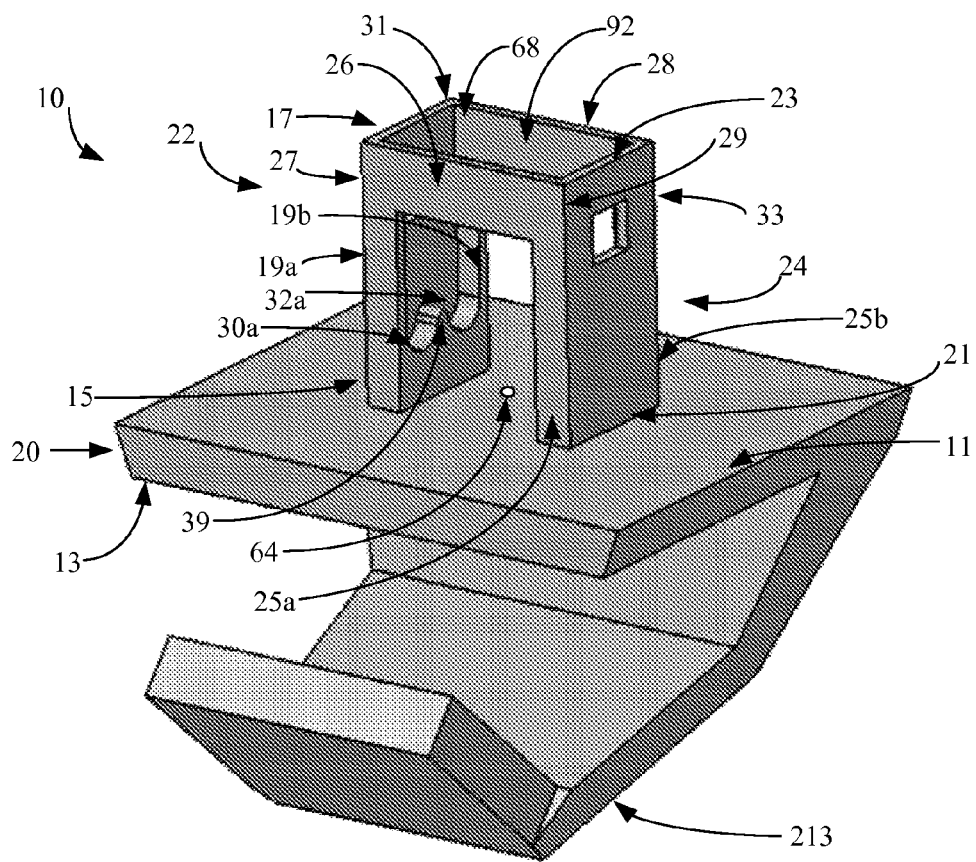
FIG. 2 of the drawings is a perspective view of an embodiment of the housing of the clip apparatus of the present disclosure, showing, in particular, the structure of a pair of cradles contained on a first wall.

While this disclosure is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the disclosure, and some of the components may have been distorted from actual scale for purposes of pictorial clarity.

Clip apparatus 10, as shown in FIG. 1, includes a housing 12, a first retention arm 14, a second retention arm 16, and a releasable arm locking assembly 18. Along with other uses, the clip apparatus can be used to couple outside structures together, for example, as an automobile headliner clip or to hold accessories through the headliner of the vehicle. In the particular embodiment shown, the clip apparatus includes a hook 213, such as a coat hook which is positioned on the headliner of a vehicle. Of course, the clip apparatus is not limited to use in association with an automotive headliner, or with automobiles in general. It will be understood that the clip apparatus is suitable for use in association with the retention of other objects. The clip apparatus can be made from a polymer or a metal, but is not limited thereto (i.e., other materials and other configurations and combinations of materials are likewise contemplated).

The housing 12, as shown in FIGS. 1, 2, 5 and 6, includes a base 20, a first side wall 22, a second side wall 24, a first upper cross brace 26, a second upper cross brace 28, a first set of opposing cradles 30a and 30b, and a second set of opposing cradles 32a and 32b. The base 20 has an inner surface 11, an outer surface 13, and an access hole 64 extending therethrough. As will be explained, a tool can be inserted into the access hole to access the arm locking assembly 18, to, in turn, disengage the clip apparatus 10 from an outside structure (indeed, wherein the arm locking assembly is a releasable arm locking assembly). The outer surface 13 of the base 20 can include a variety of automotive headliner accessories, such as a coat hook, but is not limited thereto. In other embodiments, the base may be a substantially planar and otherwise featureless structure which is utilized to retain the headliner itself to the body of the automobile. The base defines a flange about the side walls which, as will be explained, provides a surface against which an outside structure can be sandwiched in cooperation with the retention arms.

The first side wall 22 extends from the inner surface 11 of the base 20 and includes a proximal end 15, a distal end 17 and opposing edges 19a and 19b. The second side wall 24 is spaced apart from the first side wall 22 and also extends from the inner surface 11 of the base 20 having a proximal end 21, a distal end 23, and opposing edges 25a and 25b. The side walls provide a structure by which to rotatably couple the retention arms in a spaced apart orientation from the base, to, in turn, allow the retention arms to cooperate with the base to sandwich the outside structure therebetween.

The first upper cross brace 26 has a first end 27 and a second end 29. The first end 27 of the first upper cross brace 26 is positioned on an edge 19a near the distal end 17 of the first side wall 22. The second end 29 is positioned on an edge 25a near the distal end 23 of the second side wall 24. The second upper cross brace 28 is spaced apart from the first upper cross brace 26 and has a first end 31 and a second end 33. The first end 31 of the second upper cross brace 28 is positioned on an edge 19b near the distal end 17 of the first side wall 22. The second end 33 is positioned on an edge 25b near the distal end 23 of the second side wall 24. The cross braces provide additional structural rigidity to the side walls, allowing the side walls to properly rotatably retain the retention arms.

The first side wall 22, the second side wall 24, the first upper cross brace 26, and the second upper cross brace 28 together define a frame which rotatably retains the retention arms to allow the retention arms to rotate in a spaced apart orientation from the base and to cooperate with the flange defined by the base to retain an outside structure therebetween in a sandwiched orientation. These structures likewise define opposing side passages 66a and 66b and a central cavity 92. An upper opening 68 is defined by the distal end 17 of the first side wall 22, the distal end 23 of the second side wall 24 and the first 26 and the second 28 upper cross brace at an upper end thereof. The opposing side passages 66a and 66b provide the necessary openings for the housing to allow the retention arms to rotate between a retracted and a deployed orientation.

The first set of opposing cradles 30a and 30b are positioned side by side on the first side wall 22 and are u-shaped forming a peak 39 therebetween. The second set of opposing cradles 32a and 32b are positioned on the second side wall 24 and are u-shaped forming a peak 41 therebetween. The u-shape of the cradles are not deemed to be limiting. As will be explained the first set of opposing cradles 30a and 30b and the second set of opposing cradles 32a and 32b couple to opposing respective ends of the first 14 and the second 16 retention arms to define each axis of rotation thereof. In the embodiment shown, the housing 12 itself is approximately 11.50×15.00 mm and is made from a metal or a plastic. Of course, the housing 12 is not limited to any particular size or material.

It will be understood that the first retention arm 14 and the second retention arm 16 are substantially identical in configuration, although variations are contemplated. Generally, the retention arms rotate in opposing directions which appear to be substantially mirror images of each other. Of course, depending on various outside structures the retention arms may have different configurations, even though they are shown as having substantially the same configurations in the embodiments shown.

Figure 3:
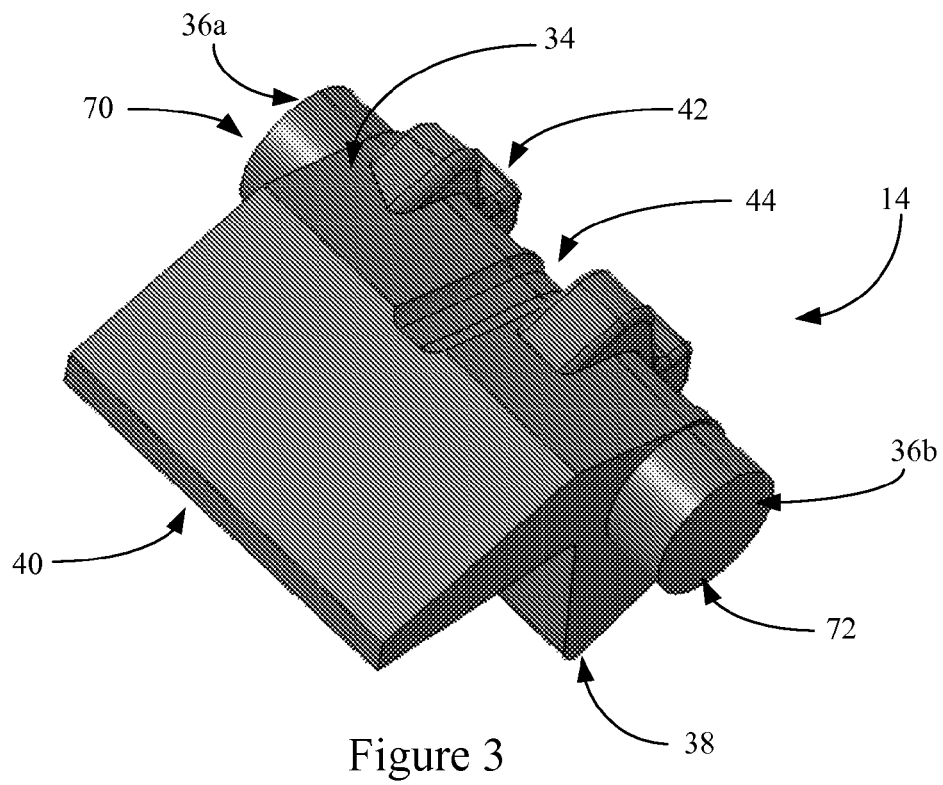
FIG. 3 of the drawings is a perspective view of an embodiment of the first retention arm of the clip apparatus of the present disclosure.

The first retention arm 14, as shown in FIG. 3, has a body 34, opposing pivots 36a and 36b, a pivoting leg 38, a retention leg 40, a plurality of biasing member interfacing ribs 42, and a channel. The retention arm comprises a metal or polymer material. It is contemplated that it may be an extrusion with machining or a molded member, while other methods of formation are likewise contemplated.

The elongated body 34 has a first end 70 and a second end 72 and is configured to extend between the first 22 and the second 24 side walls. Opposing pivots 36a and 36b are positioned on the first end 70 and the second end 72 of the body 34. One pivot 36a is positioned on the first end 70 and one pivot 36b is positioned on the second end 72. In the embodiment shown, they are integrally molded to each other. The pivots are circular in configuration, but are not limited thereto, and are placed into and cooperate with the opposing sets of cradles 30a and 32a in the housing 12, so as to define an axis of rotation with the pivots providing the rotative support therefor.

The pivoting leg 38 extends radially outward from the body 34. The retention leg 40 extends radially outward from the body 34. The two legs are radially spaced apart from each other. Each one of these legs has an effective length, which is the length of the leg radially outward from the axis of rotation defined by the pivots 36a and 36b. In the embodiment shown, the two legs are spaced apart, radially, a quarter of a circle, or 90°. Of course, the legs may be at different angular displacements relative to each other. The elongated body is contoured around the legs so that the elongated body is capable of rotating along the axis without undesirably interfering with the housing.

It will be understood that the first retention arm 14 rotates between a retracted and deployed orientation wherein the various legs are in different orientations and positions relative to the housing 12. More specifically, in the retracted orientation, the retention leg 40 is substantially retained within the central cavity 92 and the pivoting leg 38 is at least partially outside the central cavity 92 through a first of the opposing side passages 66a.

In the deployed orientation, the retention leg 40 extends outside the central cavity 92 and through the first opposing side passage 66a and in a position to sandwich an outside object in cooperation with the base 20.

The interfacing ribs 42 comprise a plurality of raised rib members which are positioned along the elongated body radially separated from the pivot leg and the retention leg. The ribs are configured so as to be within the cavity 92 when the first retention arm 14 is in the deployed orientation so that the ribs can interface with the biasing member. It will be understood that the ribs define a plurality of structures that are spaced apart from each other, while other configurations are likewise contemplated.

The channel 44 extends between the ribs, generally in the vicinity of the ribs. The channel extends into the elongated body, and is positioned to coincide with the access hole 64 when the first and second retention arms are in the deployed orientation. In such a configuration, the tool can be inserted into the access hole 64 and can extend beyond the retention arm along the channel 44 until contacting the biasing member.

Figure 4:
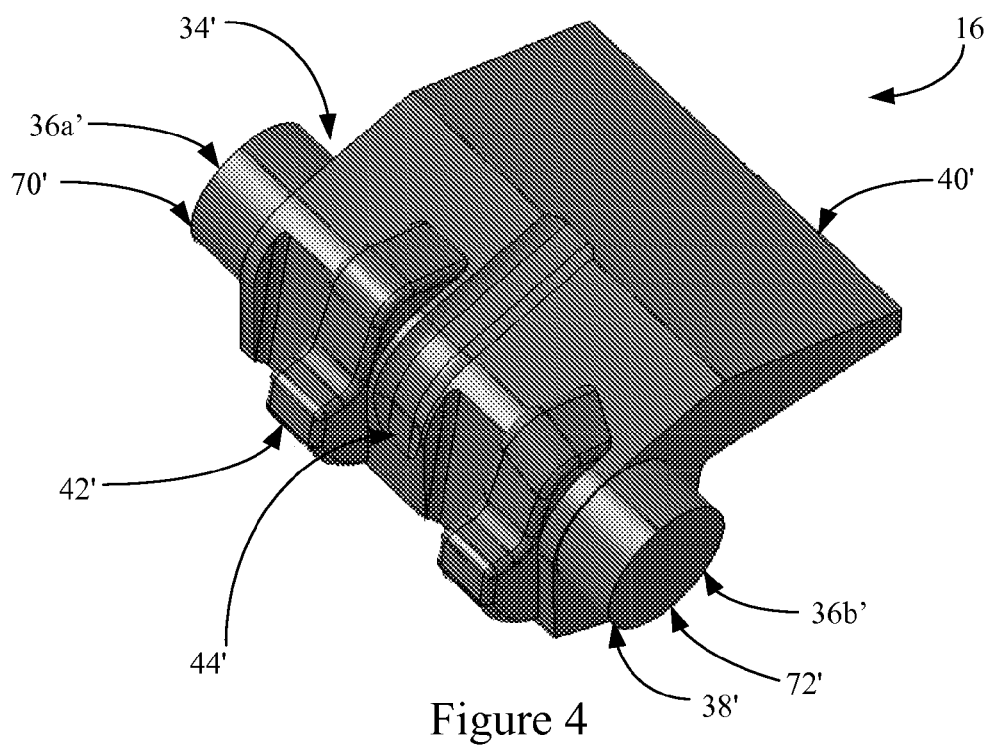
FIG. 4 of the drawings is a perspective view of an embodiment of the second retention arm of the clip apparatus of the present disclosure.

The second retention arm 16, as shown in FIG. 4, is substantially identical to the first retention arm 14, although, as explained, there may be variations between the retention arms. Thus, the similar structures that are present in each of the retention arms will be disclosed below, with the same reference number augmented by a prime ('). Again, the second retention arm and the first retention arm may be distinct and different from each other in other embodiments.

The second retention arm 16, has a body 34', opposing pivots 36a' and 36b', a pivoting leg 38', a retention leg 40', a plurality of biasing member interfacing ribs 42', and a channel. The retention arm comprises a metal or polymer material.

It is contemplated that it may be an extrusion with machining or a molded member, while other methods of formation are likewise contemplated.

The elongated body 34' has a first end 70' and a second end 72' and is configured to extend between the first 22 and the second 24 side walls. Opposing pivots 36a' and 36b' are positioned on the first end 70' and the second end 72' of the body 34'. One pivot 36a is positioned on the first end 70' and one pivot 36b' is positioned on the second end 72'. In the embodiment shown, they are integrally molded to each other. The pivots are circular in configuration, but are not limited thereto, and are placed into and cooperate with the opposing sets of cradles 32a and 32b in the housing 12, so as to define an axis of rotation with the pivots providing the rotative support therefor.

The pivoting leg 38' extends radially outward from the body 34'. The retention leg 40' extends radially outward from the body 34'. The two legs are radially spaced apart from each other. Each one of these legs has an effective length, which is the length of the leg radially outward from the axis of rotation defined by the pivots 36a' and 36b'. In the embodiment shown, the two legs are spaced apart, radially, a quarter of a circle, or 90°. Of course, the legs may be at different angular displacements relative to each other. The elongated body is contoured around the legs so that the elongated body is capable of rotating along the axis without undesirably interfering with the housing.

It will be understood that the second retention arm 16 rotates between a retracted and deployed orientation wherein the various legs are in different orientations and positions relative to the housing 12. More specifically, in the retracted orientation, the retention leg 40' is substantially retained within the central cavity 92 and the pivoting leg 38' is at least partially outside the central cavity 92 through a second of the opposing side passages 66b.

In the deployed orientation, the retention leg 40' extends outside the central cavity 92 and through the first opposing side passage 66b and in a position to sandwich an outside object in cooperation with the base 20.

The interfacing ribs 42' comprise a plurality of raised rib members which are positioned along the elongated body radially separated from the pivot leg and the retention leg. The ribs are configured so as to be within the cavity 92 when the second retention arm 14 is in the deployed orientation so that the ribs can interface with the biasing member. It will be understood that the ribs define a plurality of structures that are spaced apart from each other, while other configurations are likewise contemplated.

The channel 44' extends between the ribs, generally in the vicinity of the ribs. The channel extends into the elongated body, and is positioned to coincide with the access hole 64 when the first and second retention arms are in the deployed orientation. In such a configuration, the tool can be inserted into the access hole 64 and can extend beyond the retention arm along the channel 44' until contacting the biasing member.

Figure 6:
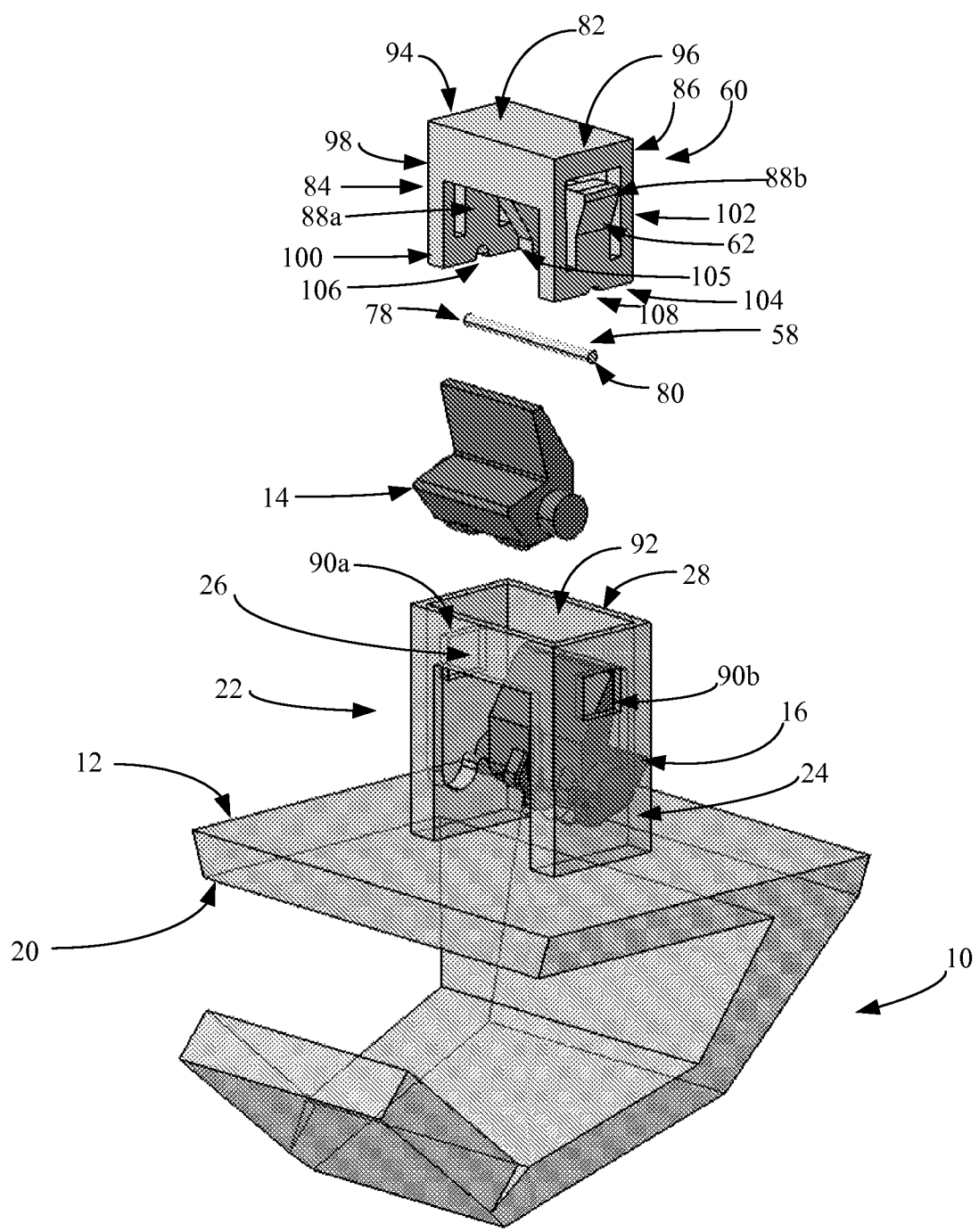
FIG. 6 of the drawings is a partially exploded perspective view of an embodiment of the clip apparatus of the present disclosure, showing, in particular, the details of the locking cap.
Figure 8:
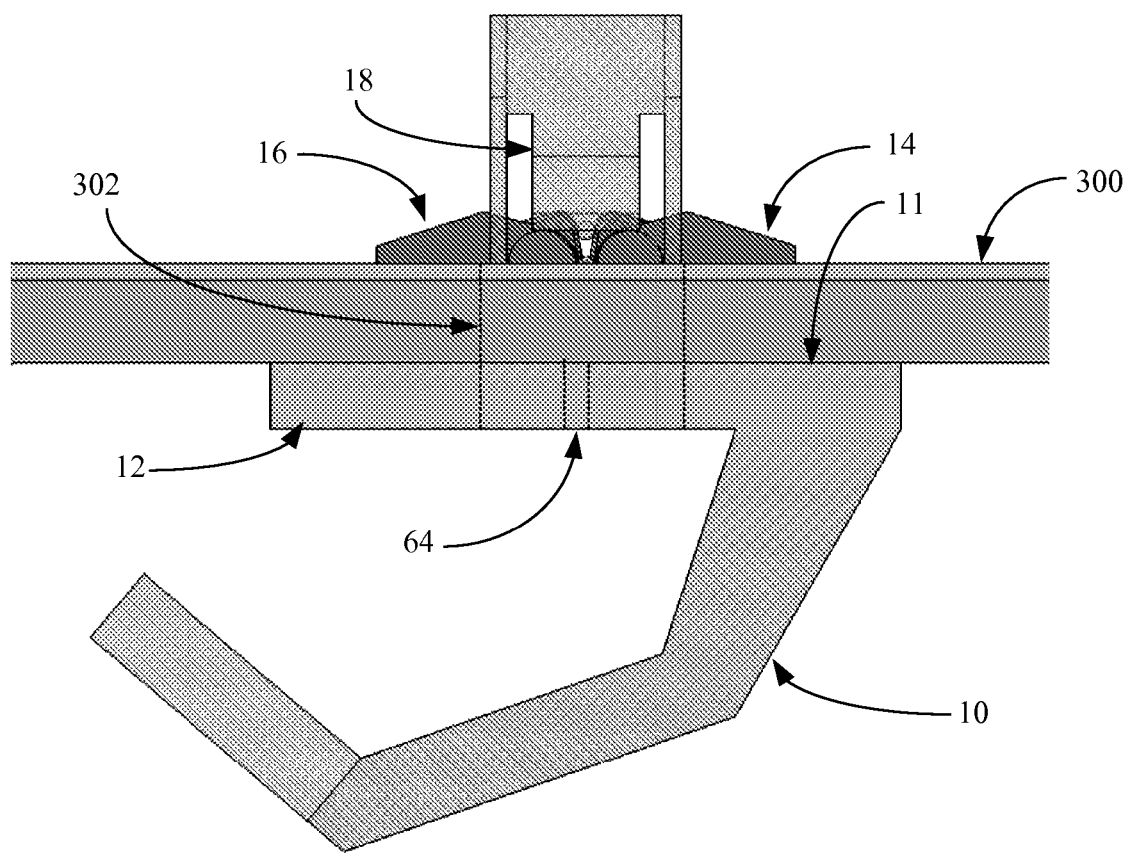
FIG. 8 of the drawings is a side elevational view of a second embodiment of the clip apparatus of the present disclosure, showing, in particular, the clip apparatus coupled to an outside surface, by extending through an opening therein and sandwiching the outside surface between the respective retention arm and the inner surface of the base.
Figure 9:
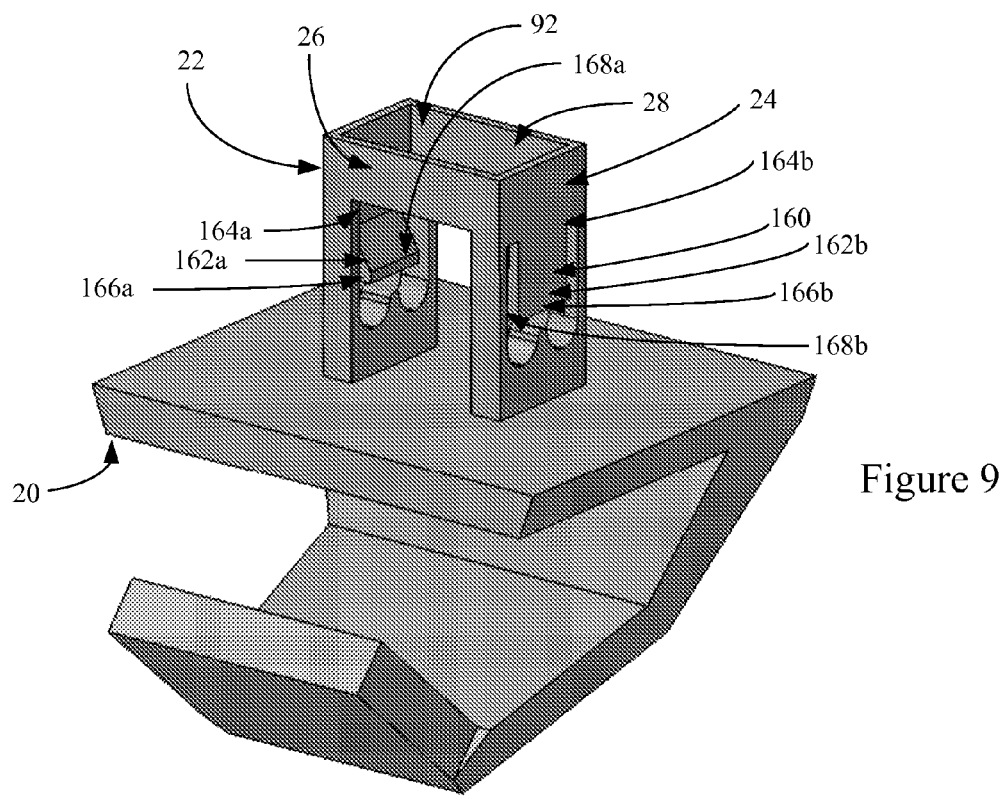
FIG. 9 of the drawings is a perspective view of a second embodiment of the housing of the clip apparatus of the present disclosure, showing, in particular, the structure of a pair of cradles contained on a first wall.
Figure 10:
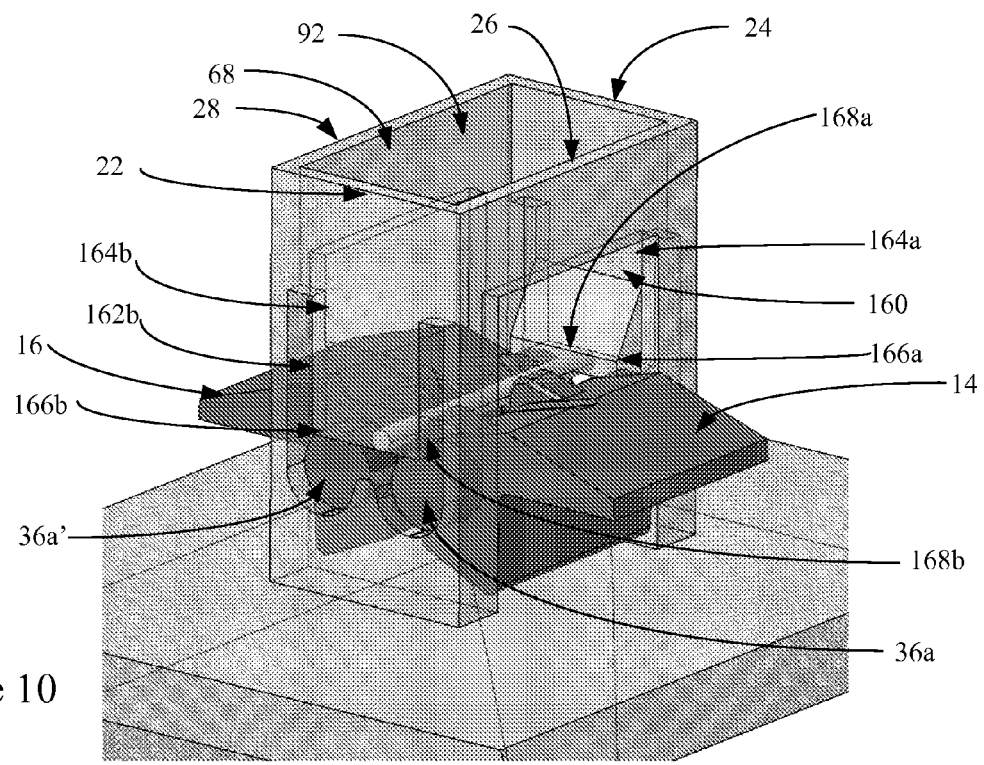
FIG. 10 of the drawings is a partial perspective view of a second embodiment of the housing of the clip apparatus of the present disclosure, showing, in particular, the frame with the retention arms in a deployed orientation.
Figure 11:
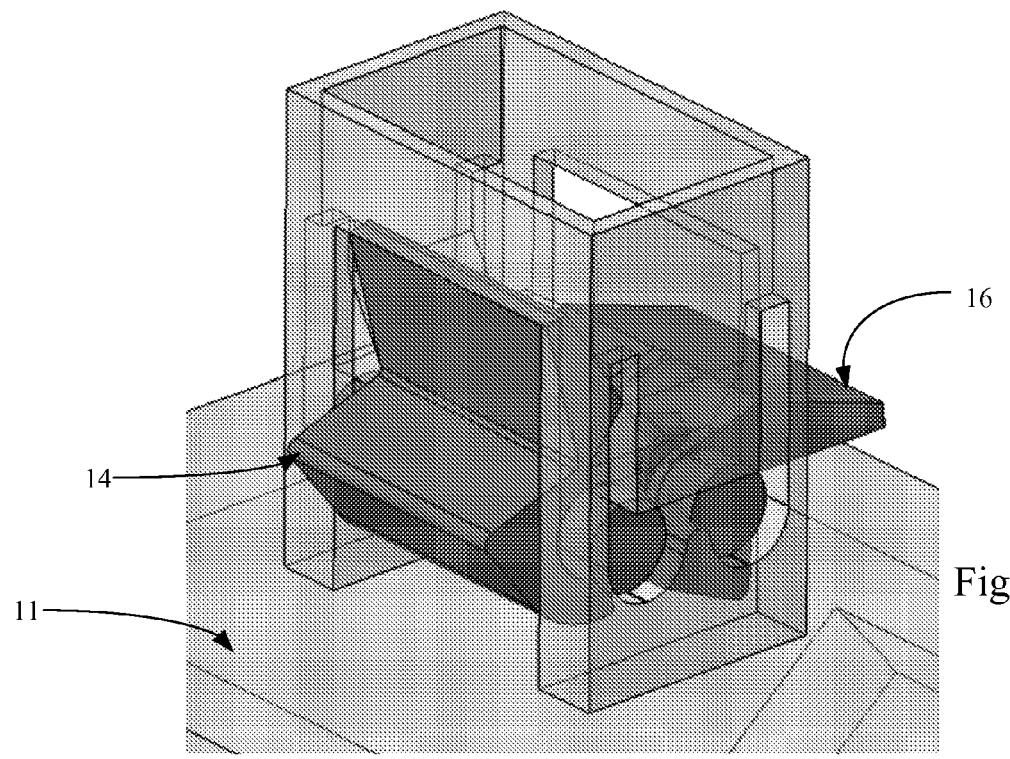
FIG. 11 of the drawings is a partial perspective view of a second embodiment of the housing of the clip apparatus of the present disclosure, showing, in particular, the frame with the first retention arm in a deployed orientation and the second retention arm in a retracted orientation.
Figure 12:
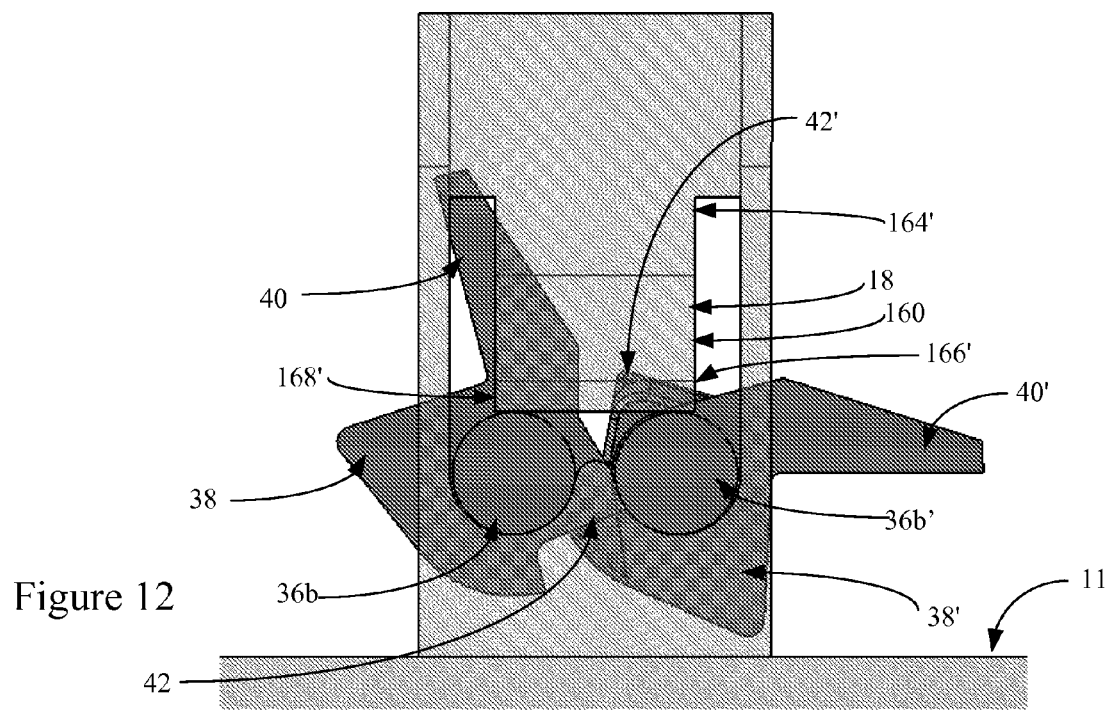
FIG. 12 of the drawings is a partial side elevational view of a second embodiment of the housing of the clip apparatus of the present disclosure, showing, in particular, the frame with the first retention arm in a deployed orientation and the second retention arm in a retracted orientation.
Figure 13:
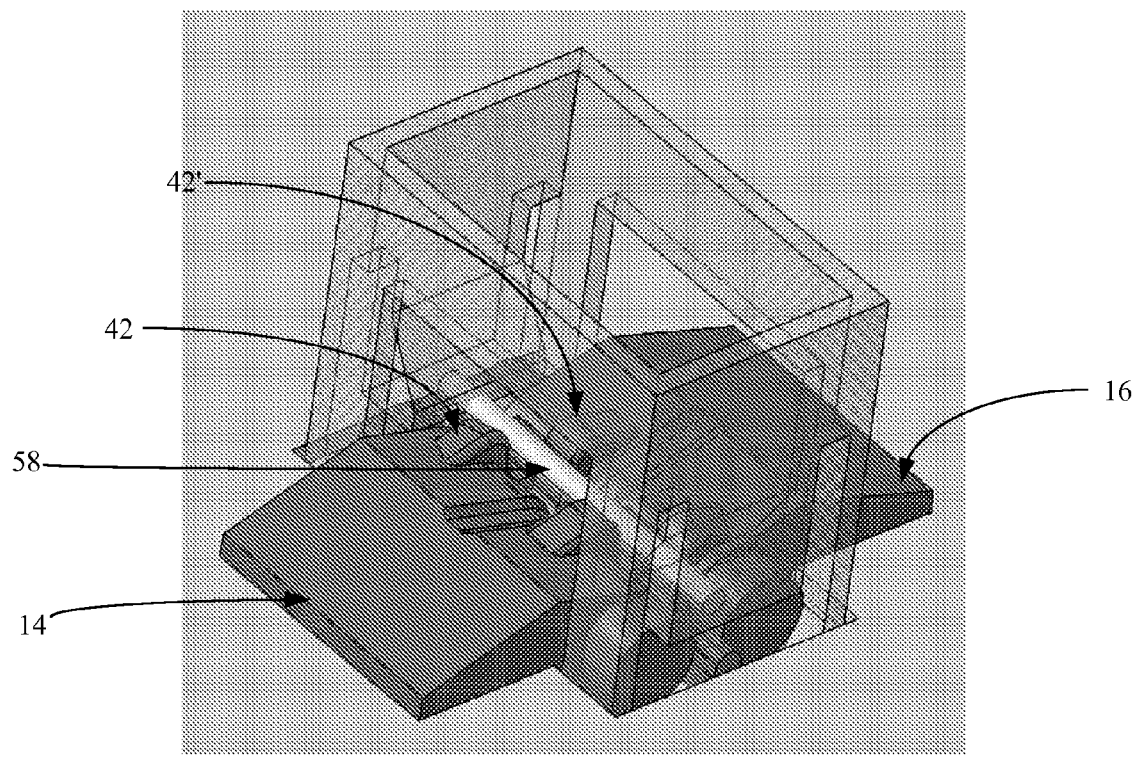
FIG. 13 of the drawings is a partial perspective view of a second embodiment of the housing of the clip apparatus of the present disclosure, showing, in particular, the frame with the retention arms in a deployed orientation.
Figure 14:
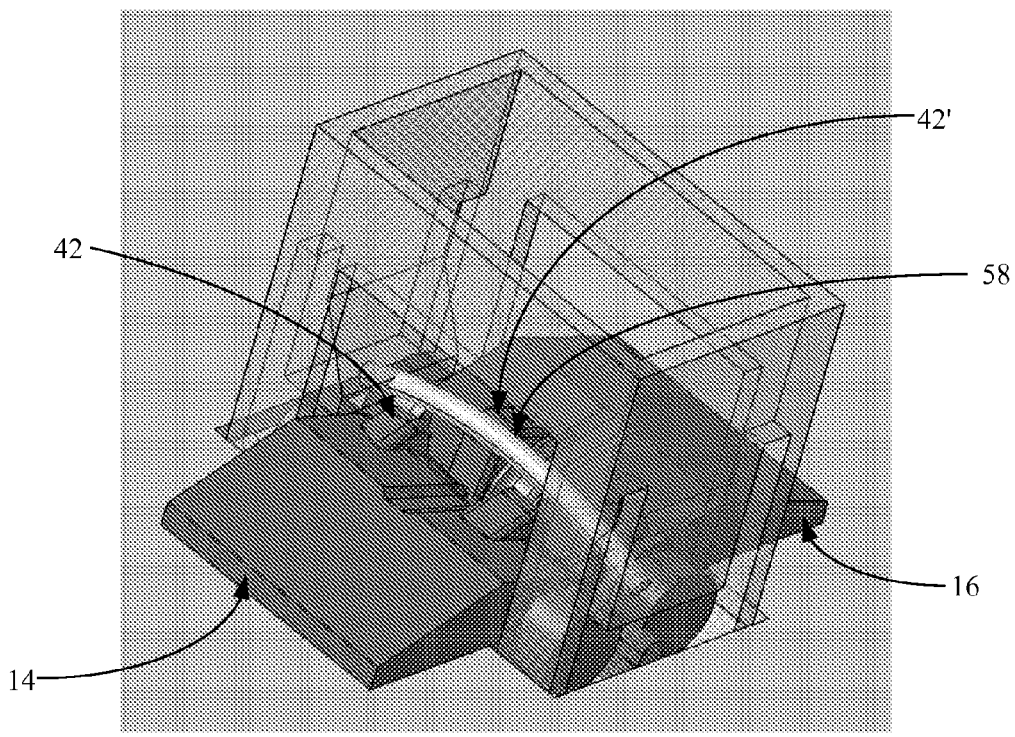
FIG. 14 of the drawings is a partial perspective view of a second embodiment of the housing of the clip apparatus of the present disclosure; showing, in particular, the frame with the retention arms in a deployed orientation with the biasing member being pushed so as to allow the return of the retention arms toward the retracted orientation.

The arm locking assembly 18 is shown in FIG. 6 as comprising biasing member 58, locking cap 60 and means 62 for coupling the locking cap to the housing. Preferably, it is a releasable arm locking assembly, but the disclosure is not limited to the same. The arm locking assembly 18 is configured to lock the rotational movement of the first and second retention arms when the arms are in the deployed orientation. Preferably, such retention is releasable, wherein the user can release the arm locking assembly to release the arms, and, in turn, to allow the arms to again rotate toward the retracted orientation.

In the embodiment of FIGS. 1 through 7b, the biasing member 58 extends between the respective peaks 39 (FIG. 2) and 41 (FIG. 5) that are created between the adjoining cradles on each of the first and second side walls 22, 24. The biasing member comprises a metal rod which has a degree of plastic deformation. The position of the biasing member is such that the biasing member interfacing ribs interact with the biasing member as the respective retention arms are directed toward the deployed orientation.

Locking cap 60 comprises a structure that is utilized to retain the respective retention arms in the respective cradles of the first and second side walls and to retain the biasing member in the desired orientation at either end thereof. To that end, the locking cap 60 comprises top wall 82, first leg 84, second leg 86. The top wall 82 includes first end 94 and second end 96, the top wall is sized so as to be received by the upper opening 68 defined by the structures of the housing. The first leg includes proximal end 98 and distal end 100. The proximal end 98 is positioned at the first end of the top wall and the distal end extends therefrom. The distal end of the first leg 84 includes groove 106 configured to receive the biasing member.

Similarly, the second leg 86 includes proximal end 102 and distal end 104. The proximal end 102 is positioned at the second end 96 of the top wall 82 and extends outwardly therefrom toward distal end 104. The distal end 104 further includes groove 108 which is configured to receive the biasing member. Additionally, the locking cap may include stop 105 which is provided between the first and second legs and terminates in a spaced apart orientation from the biasing member. Such a configuration provides a stop or a limit on the movement of the biasing member when a tool is inserted through access hole 64 to move the biasing member out of the way.

As is shown in FIG. 6, the first and second legs are substantially perpendicular to each other and are positionable within the cavity 92 of the housing 12 so as to abut the inner surfaces of the first and second side walls. In such a configuration, the opposing first and second legs 84, 86, interface with the opposing pivots 36a, 36b, 36a' and 36b' as well as with opposing ends 78, 80 of the biasing member to retain the retention arms and the biasing means in the desired configuration.

The locking cap and housing locking means 62 comprises tabs 88a, 88b and slots 90a, 90b. The locking tabs are positioned on one of the opposing side walls 22, 24 of the housing 12 or on the opposing legs 84, 86 of the locking cap 60. The slots 90a, 90b are positioned on the other of the opposing side walls 22, 24 of the housing 12 or the opposing legs 84, 86 of the locking cap 60. The opposing tab 88a interfaces with slot 90a and tab 88b interfaces with slot 90b when the locking cap is positioned in the desired configuration within the cavity 92.

Of course, other means of locking the locking cap and the housing are contemplated, including, interference fits, flanges, and tabs, adhesives, welding and the like. It is likewise contemplated that the locking cap be permanently positioned in place such that it is difficult to remove the locking cap without destroying the same.

In use, the user first assembles the clip apparatus 10. In particular, and with reference primarily to FIG. 6 (and secondarily to FIGS. 1-5), it is first necessary to provide the housing 12. In the embodiment shown, the housing includes a coat hook on the outer surface 13 of the base. Once provided, the user inserts the first and second retention arms into the cavity 92 of the housing 12. Specifically, the opposing pivots 36a, 36b of the first retention arm 14 are directed into the first set of opposing cradles 30a, 30b. Preferably, for ease of assembly, the first retention arm 14 is rotated so as to be in an orientation other than deployed.

Similarly, the second retention arm 16 is positioned by extending opposing pivots 36a', 36b' into the respective cradle of the second set of opposing cradles 32a, 32b. Again, for ease of assembly, the second retention arm is installed in an orientation other than the deployed orientation.

Once the two retention arms are positioned, the biasing member can be inserted into the cavity 92 and positioned between the peaks 39, 41. It is desired that the two retention arms remain in an orientation other than the deployed orientation to minimize the movement of the biasing member or the contact therewith.

After positioning the biasing member, the user can then insert the locking cap 60. Specifically, to complete the assembly, the user directs the locking cap into position by directing the two leg members into the cavity 92 while they are abutting the inner surfaces of the respective first and second side wall 22, 24. As the locking cap is slid into position, the distal ends 100, 104 of the first leg 84 and the second leg 86, respectively, contact and engage the opposing pivots of the first and second retention arms. Additionally, the grooves 106, 108 are positioned so that the biasing member at opposing ends is introduced thereinto. Finally, continued movement locks the locking cap to the housing by extending the tabs 88a, 88b, into the slots 90a, 90b, respectively to releasably lock the two structures together.

Figure 5:
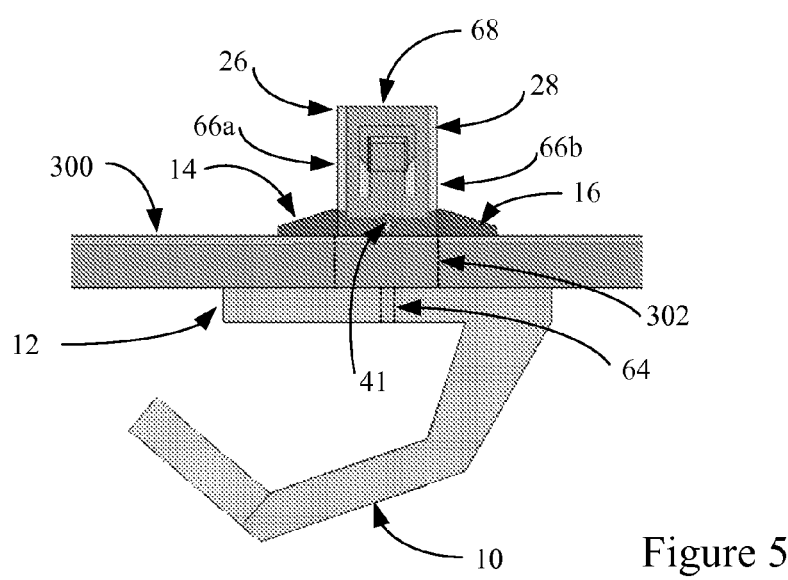
FIG. 5 of the drawings is a side elevational view of an embodiment of the clip apparatus of the present disclosure, showing, in particular, the clip apparatus coupled to an outside surface, by extending through an opening therein and sandwiching the outside surface between the respective retention arm and the inner surface of the base.

The apparatus is now ready for insertion into the structure of the vehicle. In operation, the user identifies the proper clip apparatus for the particular application. In the embodiment shown, the clip apparatus and attachment will be described in the context of assembling a coat hook onto an outside structure, such as a headliner or a car chassis. The outside structure, with reference to FIG. 5 is shown at 300 and includes opening 302 which is generally sized to accept the housing 12. The particular component which corresponds to the outside structure can be varied without departing from the scope of the disclosure.

With reference to FIG. 1, the user first insures that the clip apparatus is configured with the first and second retention arms 14, 16 in the retracted orientation, or at least in an orientation other than the deployed orientation. In such orientations, the pivoting legs 38, 38' extend outside of the cavity 92 through the opposing passages 66a, 66b, respectively. Once the proper orientation has been determined and configured, the user inserts the housing 12 into the opening 302 of the outside structure 300. As the housing passes through the opening 302 eventually, the pivoting legs 38, 38' contact the opening 302, and continued inward movement begins to rotate the pivoting legs relative to the housing. In particular, the pivot legs begin to rotate so as to direct outward movement of the respective retention legs. Continued movement directs the first and second retention arms into the deployed orientation.

With reference to FIG. 7a, as the deployed orientation approaches, the outside object becomes increasingly sandwiched between the retention legs 40, 40' and the inner surface 11 of the base. Eventually, continued insertion rotates the retention legs so that the biasing member interfacing ribs 42 come into contact with the biasing member 58 from an area below the biasing member. Through continued insertion, the biasing member 58 is elastically deformed until the biasing member has been displaced by the biasing member interfacing ribs and the ribs clear the biasing member. Without the ribs outwardly biasing and elastically deforming the biasing member, the biasing member returns to its original (and substantially linear, in this embodiment) configuration.

With reference to FIGS. 5 and 7a, once the ribs extend beyond the biasing member, the retention legs 40 have reached the deployed orientation, and the clip apparatus is secured to the outside structure by sandwiching the outside structure between the retention legs 40, 40' and the inner surface 11 of the base 20. The configuration of the biasing member interfacing ribs is such that a pulling motion, in an effort to remove the clip apparatus from the opening 302 is resisted by the biasing member in cooperation with the ribs. In turn, the clip apparatus is coupled to the outside structure, and can withstand a substantially large outward pulling force without detaching from the outside structure.

There may come a time when it is desirable to remove the clip apparatus from retention with the outside surface and to remove it from the opening 302. In such an instance, the user grabs an elongated tool (such as a thin screwdriver or thin wire) and directs the wire into the access hole 64 which is accessible from outer surface 13. The wire is pushed beyond the first and second retention arms by extending along the two opposing channels 44, 44' of the retention arms. Eventually, the wire contacts the biasing member, and continued movement begins to elastically deform the biasing member in an upward direction (see, FIG. 7B). Such further forcing of the wire against the biasing member will direct the biasing member upward until it contacts the stop 105. By that time, the biasing member is sufficiently out of the way of the biasing member interfacing ribs 42, 42' and the retention arms 14, 16 can be rotated away from the deployed orientation and toward the retracted orientation. Once sufficiently rotated toward the retracted orientation, the user can withdraw the clip apparatus from within the opening 302. It is contemplated that the clip apparatus is fully reusable, which allows for disassembly, repairs and reassembly without having to replace the various clips.

FIGS. 8 through 14 show a second embodiment of the present disclosure. The second embodiment is configured similar to the first embodiment, except that the releasable arm locking assembly does not include a locking cap or any means for attaching the locking cap. As such, similar structures to the first embodiment utilize the same reference numbers. Rather, the releasable arm locking assembly includes leg locking assembly 160 which includes a pair of opposing locking legs 162a, 162b. These legs are molded or otherwise integrally formed with the first side wall 22 and the second side wall 24, respectively. The opposing locking legs 162a, 162b are configured to releasably retain the biasing member 58 and also the first retention arm 14 and second retention arm 16 in the desired operating position.

It will be understood that the opposing locking legs 162a, 162b are substantially identical and substantially mirror images of each other. As such, opposing locking leg 162a will be described in detail with the understanding that the other opposing locking leg 162b is a substantially mirror image thereof and like structures will have the same reference number augmented by a prime ('). Specifically, opposing locking leg 162a includes proximal end 164 and distal end 166. The proximal end 164 emanates from the distal end 17 of side wall 22 and is directed toward the inner surface 11 of the base 20.

An inwardly directed tab 168 is positioned at the distal end 166 of the opposing locking leg 162a. The inward tab extends into the cavity 92 and is immediately outboard of the cradles 30a, 32a and peak 39. The end opposite of the end that is outboard of the cradles and the peak is inclined inwardly toward the distal end thereof. It will be understood that due to the construction of the opposing biasing leg and its relationship with the first side wall 22, the distal end of the opposing locking leg 162a can be outwardly moved so that the inward tab 168 is moved substantially out of the cavity 92.

Similarly, with respect to the opposing biasing leg 162b, this biasing leg includes proximal end 164' and distal end 166'. The proximal end 164' emanates from the distal end 23 of side wall 24 and is directed toward the inner surface 11 of the base 20.

An inwardly directed tab 168' is positioned at the distal end 166' of the opposing locking leg 162b. The inward tab extends into the cavity 92 and is immediately outboard of the cradles 30b and 32b and peak 41. The end opposite of the end that is outboard of the cradles and the peak is inclined inwardly toward the distal end thereof. It will be understood that due to the construction of the opposing locking leg 162b' can be outwardly moved so that the inward tab 168' is moved substantially out of the cavity 92.

To assemble the apparatus of such an embodiment, when it is time to assemble the first retention arm 14 and the second retention arm 16, along with the biasing member, the user first directs the first and second retention arms into the cavity and toward placement in the respective one of the pairs of opposing cradles. At some point, the opposing pivots 36a, 36b contact the inwardly directed tab 168'. Due to the cantilever nature of the opposing locking legs, and the inclined portion of the inwardly directed tab 168 and 168', further advancement of the first retention arm directs the opposing locking legs outwardly until the inwardly directed tabs are driven substantially out of the cavity and until the first retention leg can be directed past the inwardly directed tabs. Once fully past the inwardly directed tabs and into the opposing cradles, the opposing locking legs will be directed inwardly so that they return to their respective original configuration. At such time, the opposing locking legs, and in particular the inwardly directed tabs are blocking removal of the first retention arm 14.

The same process is repeated with each of the second retention arm 16 and the biasing member 58 until all three components have been directed beyond the inwardly directed tabs.

FIGS. 15 through 19 show a third embodiment of the present disclosure. The second embodiment is configured to achieve the same results as the first embodiment, namely to be extended through an opening in an outside structure and to sandwich the outside structure between the retention arms and the base. It will be understood that similar structures to the other embodiments utilize the same reference numbers. In the embodiment, the first side wall 22, the second side wall 24 and the first and second upper cross braces are integrally formed with the first and second upper cross braces being substantially larger. The side walls may blend into the cross braces, and further lower cross braces may also be provided so that there appears to be four separate full walls making up the frame of the housing. Such a configuration nevertheless includes a first retention arm and a second retention arm that extends between the opposing side walls and has these retention arms rotatable between these two walls. This is the case regardless of whether the actual axis of rotation is formed into a cross brace or into the side wall.

Additionally, in such an embodiment, the biasing member interfacing ribs can be removed and instead the elongated body may include an outward configuration which has an extended hump region 51, 51' respectively which extends radially outward from the longitudinal axis of the body 34, 34' of the retention arms, respectively.

The releasable arm locking assembly is shown in the second embodiment as comprising a locking block 53, and block biasing member 55. The locking block is slidably movable within the cavity 92 in a direction that traverses between the proximal ends of the first and second side walls 22, 24. The block biasing member 55 is positioned at the distal end of the first and second side walls and serves to direct the locking block 53 toward and into the inner surface 11 of the base 20.

In operation of such an embodiment, when in the retracted position and prior to being in the deployed orientation, the block biasing member 55 biases the locking block 53 against the pair of extended hump region 51, 51'. As the retention arms are rotated into the deployed orientation (or at least relatively close to the deployed orientation), the extended hump region 51, 51' are sufficiently moved out of the way that the block biasing member 55 directs the locking block past the retention arm so as to be positioned between them. The block biasing member 55 maintains the locking block 53 in position between the two retention arms. In certain embodiments, the locking block 53 may extend and be in contact with the inner surface of the base of the housing.

As with the other embodiment that is described, the user inserts a tool into the access hole that extends through the base and pushes the locking block 53. The tool overcomes the block biasing member 53 and, combined with pulling the apparatus back out of the hole (rotating the retention arms), the retention arms return toward (and eventually into) the retracted orientation.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A clip apparatus comprising:
   a housing having a base having an inner surface and a frame extending away from the inner surface, the frame defining a central cavity with a first and a second opposing passage;
   a first retention arm having a body with a pivoting leg extending radially outward from the body and a retention leg extending radially outward from the body, radially spaced apart from the pivoting leg, the body rotatably coupled to the frame to rotate about a first axis of rotation, wherein in a retracted orientation, at least a portion of the pivoting leg extending outside of the cavity through the first opposing passage and through rotation is positionable in a deployed orientation wherein the retention leg extends outside the cavity through the first opposing passage so as to be spaced apart from the base, to, in turn, be in a position to sandwich an outside surface therebetween;
   a second retention arm having a body with a pivoting leg extending radially outward from the body and a retention leg extending radially outward from the body, radially spaced apart from the pivoting leg, the body rotatably coupled to the frame to rotate about a second axis of rotation spaced apart from the first axis of rotation, at least a portion of the pivoting leg extending outside of the cavity through the second opposing passage and through rotation is positionable in a deployed orientation wherein the retention leg extends outside of the cavity through the second opposing passage so as to be spaced apart from the base, to, in turn, be in a position to sandwich the outside surface therebetween; and
   an arm locking assembly structurally configured to retain the first and second retention arms in the deployed orientation.

2. The clip apparatus of claim 1, wherein the frame further comprises a first side wall, and a second side wall together defining the opposing passages and the cavity.

3. The clip apparatus of claim 2, wherein the frame further comprises: a first upper cross brace and a second upper cross brace spaced apart from one another and positioned from an opposing edge of the first side wall to an opposing edge of the second side wall and spaced apart from the base.

4. The clip apparatus of claim 3, wherein the first upper cross brace, the second upper cross brace, the base and the opposing edges of the first side wall and the second side wall together define the opposing passages.

5. The clip apparatus of claim 3, further comprising: the cavity is defined between the first and the second side wall and the first and the second upper cross brace.

6. The clip apparatus of claim 5, wherein an upper opening is defined by the first and the second side wall and the first and the second upper cross brace at an upper end thereof.

7. The clip apparatus of claim 2, wherein the arm locking assembly further comprises:
   a biasing member having a first end coupled to the first side wall and a second end coupled to the second side wall so as to extend between the first and second retention arms;
   at least one interfacing rib positioned along each body of the first and the second retention arms, whereupon rotation of the retention arms into the deployed orientation interfaces the interfacing ribs with the biasing member to releasably maintain the retention arms in the deployed orientation.

8. The clip apparatus of claim 7, wherein the arm locking assembly further includes a locking cap having a top wall with a first end and a second end, a first leg depending from the first end of the top wall, and a second leg depending from the second end of the top wall, wherein each one of the legs having a proximal end and a distal end and a groove positioned on the distal end to engage the biasing member upon insertion of the locking cap into the cavity.

9. The clip apparatus of claim 8 further comprising a means for coupling the locking cap to the housing which comprises one of a slot and a tab associated with the first side wall and the second side wall and the other of a slot and a tab associated with the first leg and the second leg, whereupon insertion of the locking cap into the frame directs each slot to interface each of the tabs to couple the locking cap to the housing.

10. The clip apparatus of claim 9 wherein the legs further retain the first and second retention arms in a desired orientation.

11. The clip apparatus of claim 1, further comprising: a first set of opposing cradles and a second set of opposing cradles positioned on opposing side walls of the housing, the cradles couple to opposing respective ends of the first and the second retention arms to define each axis of rotation thereof.

12. The clip apparatus of claim 11, wherein the first retention arm and the second retention arm each comprise: an opposing pair of pivots positioned on the ends of the respective body, which are placed into and cooperate with the opposing sets of cradles.

13. The clip apparatus of claim 1, wherein each pivoting leg is positioned within the central cavity in the deployed orientation.

14. The clip apparatus of claim 1, wherein the arm locking assembly comprises a releasable locking assembly.

15. The clip apparatus of claim 14, wherein the arm locking assembly further comprises:
   a biasing member having a first end and a second end so as to extend between the first and second retention arms; and at least one interfacing rib positioned along each body of the first and the second retention arms, whereupon rotation of the retention arms into the deployed orientation interfaces the interfacing ribs with the biasing member to releasably maintain the retention arms in the deployed orientation.

16. The clip apparatus of claim 15 wherein the housing further includes an access hole which provides access through the base to the biasing member.

17. The clip apparatus of claim 14 wherein the arm locking assembly comprises a pair of opposing biasing legs, positioned on the frame, each biasing leg positioned proximate a biasing member and movable to accept the biasing member, whereupon positioning of the biasing member into a desired orientation, the opposing biasing legs return to a configuration to retain the biasing member in the desired orientation.

18. The clip apparatus of claim 1 wherein the first retention arm and the second retention arm each include an extended hump region which remains obstructive within the cavity when the first retention arm and the second retention arm are in an orientation other than the deployed orientation, the arm locking assembly comprising a locking block that is configured to pass beyond the extended hump regions once the first and second retention arms are in the deployed orientation so as to be positioned between the first retention arm and the second retention arm within the cavity, and a block biasing member which is configured to direct the locking block toward the base, to, in turn, maintain the locking block between the first retention arm and the second retention arm.

19. The clip apparatus of claim 18 wherein the base further includes an access opening that provides access to the cavity, to, in turn, facilitate the pushing of the locking block against the biasing member, to, in turn, facilitate the positioning of the first retention arm and the second retention arm in an orientation other than the deployed orientation.

20. A method of articulating the clip apparatus of claim 1 comprising the steps of:
    providing an outside surface with an opening sized to allow the frame to pass therethrough;
    directing the frame through the opening;
    directing the first and second retention arms into a perimeter of the opening so as to interact with the same, whereupon such interaction rotates the first and second retention arms from the retracted orientation to the deployed orientation; and
    locking the first and second retention arms in the deployed orientation, to, in turn, capture the outside surface between the respective retention arms and the base, in a sandwiched configuration.

* * * * *